(12) United States Patent
Benson (10) Patent No.: US 6,810,439 B2
(45) Date of Patent: Oct. 26, 2004

(54) SYSTEM AND METHOD TO MONITOR CONNECTIONS TO A DEVICE

(75) Inventor: Anthony Joseph Benson, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/370,327

(22) Filed: Feb. 18, 2003

(65) Prior Publication Data

US 2004/0162923 A1 Aug. 19, 2004

(51) Int. Cl.[7] .............................................. G06F 13/00
(52) U.S. Cl. ............................ 710/16; 710/15; 710/19; 710/301; 710/302
(58) Field of Search ......................... 710/15, 16, 19, 710/301, 302

(56) References Cited

U.S. PATENT DOCUMENTS

| | | | | |
|---|---|---|---|---|
| 5,892,974 A | * | 4/1999 | Koizumi et al. .............. | 710/16 |
| 5,978,861 A | * | 11/1999 | Dearden et al. ................ | 710/8 |
| 6,023,358 A | * | 2/2000 | Baney .......................... | 398/25 |
| 6,393,509 B2 | * | 5/2002 | Yamada et al. ............. | 710/300 |
| 6,477,605 B1 | * | 11/2002 | Taki et al. ................... | 710/302 |

* cited by examiner

Primary Examiner—Rehana Perveen (57) ABSTRACT

An apparatus capable of determining whether connections are properly mated includes a control device that monitors the state of input lines associated with connectors. The input lines are held at a predetermined state until a device is connected to or disconnected from one or more of the connectors. The control device detects the change in state on the input line and determines whether a connection or disconnection is occurring. When a connection is occurring, the state of an output signal is set to provide connection feedback to the device being connected via another signal line coupled to the connector. The capability to monitor connections and disconnection of multiple devices allows a system to determine whether devices are properly connected to provide the required functionality, such as properly terminating a communication port, and enabling communication with other devices.

25 Claims, 4 Drawing Sheets

SYSTEM AND METHOD TO MONITOR CONNECTIONS TO A DEVICE

RELATED APPLICATIONS

The disclosed system and operating method are related to subject matter disclosed in the following co-pending patent applications that are incorporated by reference herein in their entirety; (1) U.S. patent application Ser. No. 10/370,358, entitled "High Speed Multiple Port Data Bus Interface Architecture"; (2) U.S. patent application Ser. No. 10/370,414, entitled "High Speed Multiple Ported Bus Interface Control"; (3) U.S. patent application Ser. No. 10/370,361, entitled "High Speed Multiple Ported Bus Interface Expander Control System"; (4) U.S. patent application Ser. No. 10/370,326, entitled "High Speed Multiple Ported Bus Interface Port State Identification System"; (5) U.S. patent application Ser. No. 10/370,364, entitled "High Speed Multiple Ported Bus Interface Reset Control System"; and (6) U.S. patent application Ser. No. 10/369,832, entitled "Interface Connector that Enables Detection of Cable Connection".

BACKGROUND

A computing system may be connected to one or more peripheral devices, such as data storage devices, printers, and scanners. In a computing environment, an interface mechanism connects a computing system with the peripheral devices. The interface mechanism typically includes a data communication bus to which the devices and the computing system attach. The communication bus allows the computing system and the peripheral devices to communicate in an orderly manner. One or more communication buses may be utilized in a system.

Typically, a logic chip, known as a bus controller, monitors and manages data transmission between the computing system and the peripheral devices by prioritizing the order and the manner in which said devices take over and access the communication buses. In various interface mechanisms, control rules, also known as communication protocols, are implemented to promote the communication of information between computing systems and peripheral devices. For example, Small Computer System Interface or SCSI (pronounced "scuzzy") is an interface mechanism that allows for the connection of multiple (e.g., up to 15) peripheral devices to a computing system. SCSI is widely used in computing systems, such as desktop and mainframe computers.

The advantage of SCSI in a desktop computer is that peripheral devices, such as scanners, CDs, DVDs, and Zip drives, as well as hard drives can be added to one SCSI cable chain. The distinct advantage of SCSI is its use in network servers where several hard drives can be easily configured as fault-tolerant clusters. That is, in the event one drive fails, it can be removed from the SCSI bus, and a new one inserted without loss of data even while the system continues to transfer data. A fault-tolerant communication system is generally designed to detect faults, such as power interruption or removal or insertion of peripherals, so that it can reset the appropriate system components to retransmit any lost data.

SCSI peripherals can be also daisy chained together. In a daisy chain environment an intermediate device has two ports. The first port connects to a computing system or another intermediate device attached to a computing system. The first port allows the device to communicate with the computing system. The second port is either terminated (i.e., not attached to anything) or attached to another device and allows for the computing system and the other device to communicate through the intermediate device. Thus, one or more devices can be attached in a line using a SCSI communication bus.

A SCSI communication bus uses the SCSI protocol for data communications. Hardware implementation of a SCSI communication bus is generally done using a 50 conductor flat ribbon or round bundle cable of characteristic impedance of 100 Ohm. Currently, a SCSI communication bus includes a bus controller included on a single expansion board that plugs into the host computing system. The expansion board is referred to as "Bus Controller Card (BCC)," as a "SCSI host adapter," or "SCSI controller card."

In some embodiments, single SCSI host adapters are also available with two controllers that can support up to 30 peripherals. The SCSI host adapters can connect to an enclosure housing multiple devices. In the mid-range to high-end markets, the enclosure may have multiple controller "interface cards" or "controller cards" providing connection paths from the host adapter to SCSI buses resident in the enclosure. These controller cards can also provide bus isolation, configuration, addressing, bus reset, and fault detection functionalities for the enclosure. The controller card provides a connection path from the host adapter to the SCSI buses resident in the enclosure. The controller cards usually provide configuration, addressing, bus reset, and fault detection functionality for the enclosure.

One or more controller cards may be plugged in or unplugged from the backplane while data communication is in process. The insertion and removal of peripheral devices or controller cards to the backplane while the computing system is operating is referred to as "hot plugging."

Single-ended and high voltage differential (HVD) SCSI interfaces have known strengths and weaknesses. Whereas single ended SCSI devices are less expensive to make, differential SCSI devices can communicate over longer cables and are less susceptible to external noise influences. HVD SCSI has a higher cost associated with it. The 64 milliamp drivers required for differential (HVD) systems draw too much current to be able to drive the bus with a single chip. Single ended SCSI required only 48 milliamp drivers and can be implemented within a single chip. The high cost and low availability of differential SCSI devices also create a need for devices that convert single ended SCSI to differential SCSI such that both device types could coexist on the same bus. Differential SCSI along with its single ended alternative have reached the limits of what would be physically reliable in transfer rates, even though the flexibility of the SCSI protocol allowed for implementing much faster communications. Another problem has been the incompatibility between single ended and differential devices in the same system.

As the amount of data used and stored in systems is ever-increasing, there is a corresponding need to communicate greater quantities of data at ever-increasing speed.

SUMMARY

An apparatus capable of determining whether connections are properly mated includes a control device that monitors the state of input lines associated with connectors. The input lines are held at a predetermined state until a device is connected to or disconnected from one or more of the connectors. The control device detects the change in state on the input line and determines whether a connection or disconnection is occurring. When a connection is occurring, the state of an output signal is set to provide connection feedback to the device being connected via another signal line coupled to the connector. The capability to monitor connections and disconnection of multiple devices allows a system to determine whether devices are properly connected to provide the required functionality, such as properly terminating a communication port, and enabling communication with other devices.

An apparatus, system, and method for monitoring connections to a device, such as a bus controller card capable of communicating high speed data between host computers and peripheral devices, are provided. In one embodiment, an apparatus for detecting connection status of multiple devices includes a plurality of connectors. Each connector includes at least two pins coupled to first input signal lines. One end of a corresponding first output signal line is coupled to each of the first input signal lines. Another end of the first input signal lines and the first output signal lines are coupled to a control device.

In one aspect, the control device monitors at least two of the input signal lines to detect when at least one of the devices is attached or removed. The control device sets a corresponding connection status parameter based on whether the device was connected or disconnected. The value of the corresponding output signal is set to a predetermined value when the connection status parameter indicates the device was disconnected.

In another aspect, a second input signal line is coupled to a second pin on the corresponding connector and one end of a corresponding second output signal line is coupled to the second input signal line. The control device is coupled to another end of the second input and the second output signal lines.

In still another aspect, the control device detects a change in the signals on the first and second input signal lines, and sets a corresponding connection status parameter based on whether the device was connected or disconnected.

In another embodiment, a communication system includes a plurality of communication ports. A monitor circuit coupled to the communication ports to determine whether a device is properly connected to each of the ports.

In one aspect, each port comprises a plurality of interfaces to input signal lines, and the monitor circuit sets a signal on at least two of the input signal lines and to detect a change in the signal on at least one of the two input signal lines due to the device being connected or disconnected.

In another aspect, one end of each at least two output signal lines is coupled to a corresponding one of the at least two input signal lines. Another end of the at least two output signal lines is coupled to the monitor circuit. The monitor circuit sets a signal on at least one of the output signal lines when the monitor circuit detects a change in the signal on at least one of the input signal lines due to the device being connected or disconnected.

In yet another aspect, a portion of the monitor circuit is implemented with one or more state machines that determine whether a device is currently connected, and set the signals on the output signal lines based on the signals on the input signal lines and whether a device is currently connected.

In another embodiment, a method for monitoring a connection to a device includes pulling an input signal on the input line high via a control circuit and monitoring the input signal to detect when the input signal is pulled low by a connection being made to the device. A connection status parameter is set to indicate the connection. The input signal is monitored to detect when the connection is being removed from the device. Upon disconnection, the connection status parameter is set to indicate the disconnection, and the input signal is set to a predetermined value when the connection status parameter indicates the disconnection.

Various other features and advantages of embodiments of the invention will be more fully understood upon consideration of the detailed description below, taken together with the accompanying figures.

DETAILED DESCRIPTION

What is desired is a data communication system that can automatically sense when a device is connected to or disconnected from one or more of the system's connectors. One approach to automatic detection of connection presence is to access a line that is normally grounded by a connected device and internally pull the line high instead of low. Accordingly, if the line is at ground, a device is connected. If the line is high, a device is not connected. Systems may, however, include one or more devices that do not comply with the same method, so that a high line does not indicate with certainty that the external device is not connected. Even when a device pulls a line low when it is connected to the system, the devices may use a different ground pin on the connector than the system. What is desired is a capability to automatically sense connection of a device with certainty. In some embodiments what is further desired is a capability for automatic connection sensing that is standard for all devices.

Figure 1:
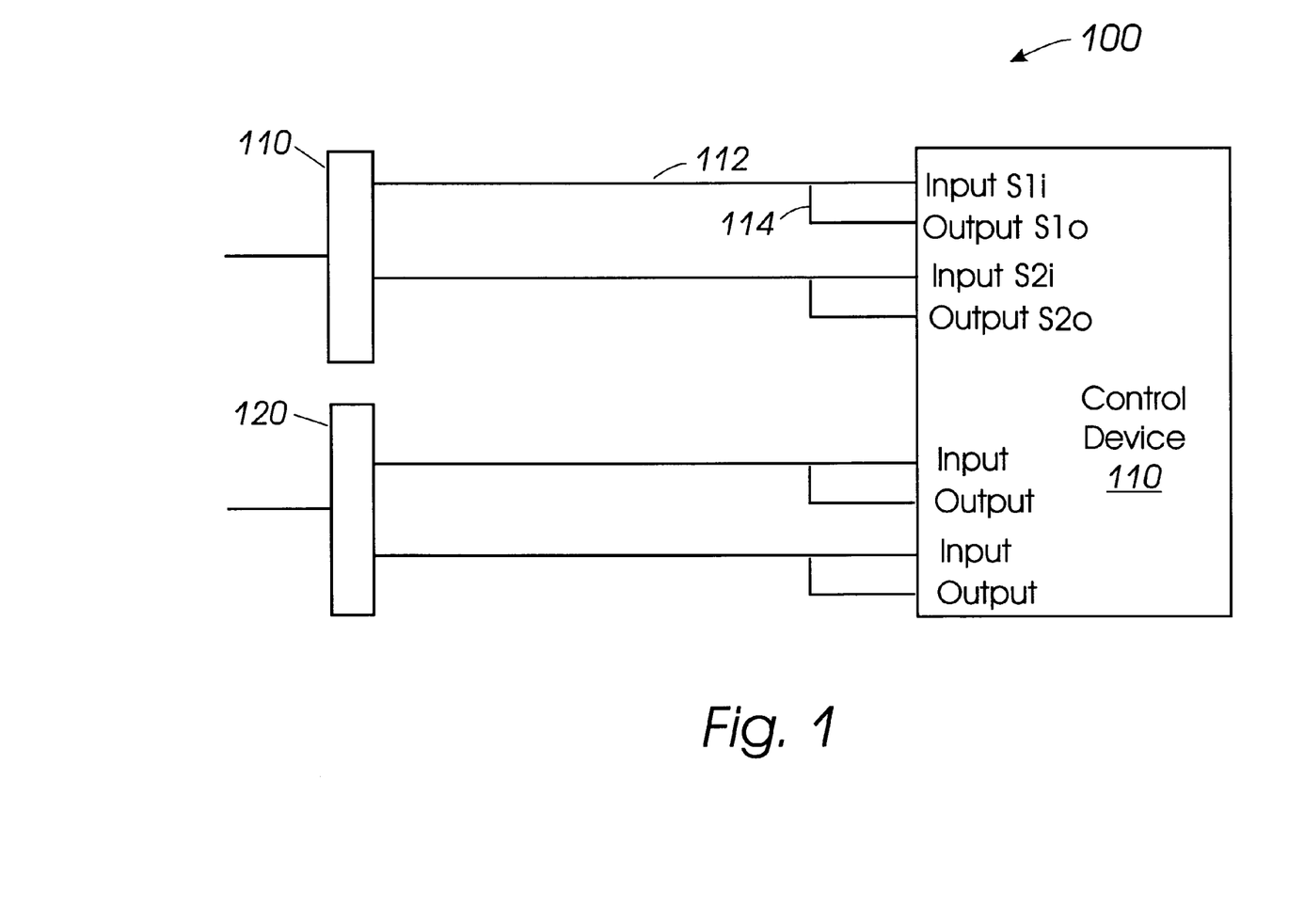
FIG. 1 shows diagram of an embodiment of a circuit capable of determining whether proper connections have been made to a device.

FIG. 1 shows diagram of an embodiment of a circuit 100 for determining whether proper connections have been made to a device such as a bus controller card (BCC). Two ports of a control device 110, 120, such as a Field Programmable Gate Array (FPGA) or Programmable Logic Device (PLD), monitor the signals on the connector pins. One monitoring port is configured as an input port and a second monitoring port is configured as an output port that is tri-stated (disabled) when not pulling the signal S1$o$ low. At least two isolated signals $S_1$, $S_2$, per connector port 110, 120 are used. If one input signal is pulled low as a result of a connection, that signal alerts control device 110 to pull the second line down so that the other device can also sense the connection. Logic executing on the control device 110 transfers to a "connected" state and waits for at least one signal to go high indicating disconnection. Upon disconnection, output signals $S_{1o}$, $S_{2o}$, are tri-stated.

Referring to TABLE I, a truth table shows state relationships for two input signals and two output signals with state signals associated with the output signals. Valid states are indicated in bold.

TABLE I

| Path | Input $S_2(I_2)$ | Input $S_1(I_1)$ | State 1 | State 0 |
|------|------------------|------------------|---------|---------|
| 0    | 0 | 0 | 0 | 0 |
| 1    | 0 | 0 | 0 | 1 |
| 2    | 0 | 0 | 1 | 0 |
| 3    | 0 | 0 | 1 | 1 |
| 4    | 0 | 1 | 0 | 0 |
| 5    | 0 | 1 | 0 | 1 |
| 6    | 0 | 1 | 1 | 0 |
| 7    | 0 | 1 | 1 | 1 |
| 8    | 1 | 0 | 0 | 0 |
| 9    | 1 | 0 | 0 | 1 |
| 10   | 1 | 0 | 1 | 0 |
| 11   | 1 | 0 | 1 | 1 |
| 12   | 1 | 1 | 0 | 0 |
| 13   | 1 | 1 | 0 | 1 |
| 14   | 1 | 1 | 1 | 0 |
| 15   | 1 | 1 | 1 | 1 |

The occurrence of a connection at signal $S_{1i}$ causes the control device 110 to transitional signals $S_{1i}$, $S_{2i}$, $S_{2o}$, $S_{1o}$ through states 0-4-6-14 as shown in TABLE II.

TABLE II

| Path | Input $S_2(I_2)$ | Input $S_1(I_1)$ | State 1 | State 0 |
|------|------------------|------------------|---------|---------|
| 0    | 0 | 0 | 0 | 0 |
| 4    | 0 | 1 | 0 | 0 |
| 6    | 0 | 1 | 1 | 0 |
| 14   | 1 | 1 | 1 | 0 |

When a disconnection occurs at signal $S1i$, the state of signals $S1i$, $S2i$, $S2o$, $S1o$ transition through paths 14-10-8-0 as shown in TABLE III below.

TABLE III

| Path | Input $S_2(I_2)$ | Input $S_1(I_1)$ | State 1 | State 0 |
|------|------------------|------------------|---------|---------|
| 14   | 1 | 1 | 1 | 0 |
| 10   | 1 | 0 | 1 | 0 |
| 8    | 1 | 0 | 0 | 0 |
| 0    | 0 | 0 | 0 | 0 |

When a connection is sensed at Input S2, the state transition of signals $S_{1i}$, $S_{2i}$, $S_{2o}$, $S_{1o}$ includes paths 0-8-9-13 as shown in TABLE IV.

TABLE IV

| Path | Input $S_2(I_2)$ | Input $S_1(I_1)$ | State 1 | State 0 |
|------|------------------|------------------|---------|---------|
| 0    | 0 | 0 | 0 | 0 |
| 8    | 1 | 0 | 0 | 0 |
| 9    | 1 | 0 | 0 | 1 |
| 13   | 1 | 1 | 0 | 1 |

Signals $S_{1i}$, $S_{2i}$, $S_{2o}$, $S_{1o}$ transition through paths 13-5-4-0, as shown in TABLE V, when a disconnection occurs at input port $S_2$.

TABLE V

| Path | Input $S_2(I_2)$ | Input $S_1(I_1)$ | State 1 | State 0 |
|------|------------------|------------------|---------|---------|
| 13   | 1 | 1 | 0 | 1 |
| 5    | 0 | 1 | 0 | 1 |
| 4    | 0 | 1 | 0 | 0 |
| 0    | 0 | 0 | 0 | 0 |

Information regarding whether a connection or disconnection is occurring is used to determine the next state. State information follows from the fact that when a disconnection occurs at signal $S_{1i}$, or a connection occurs at signal $S_{2i}$, the states of signals $S_{1i}$, $S_{2i}$, $S_{1o}$, $S_{2o}$ transition through path 8 (1000). Path 4 (0100) is another common path that is transitioned during a disconnection at signal $S_{1o}$, and a connection at port $S_{2o}$. In order to determine the next state to transition to, one or more state machines, such as the embodiments of state machines 200 and 300 shown in FIGS. 2 and 3, respectively, can be used to determine: (1) whether a connector is being attached to or removed from circuit 100 shown in FIG. 1, (2) the next state based on the values of $S_{1i}$, $S_{2i}$.

Figure 2:
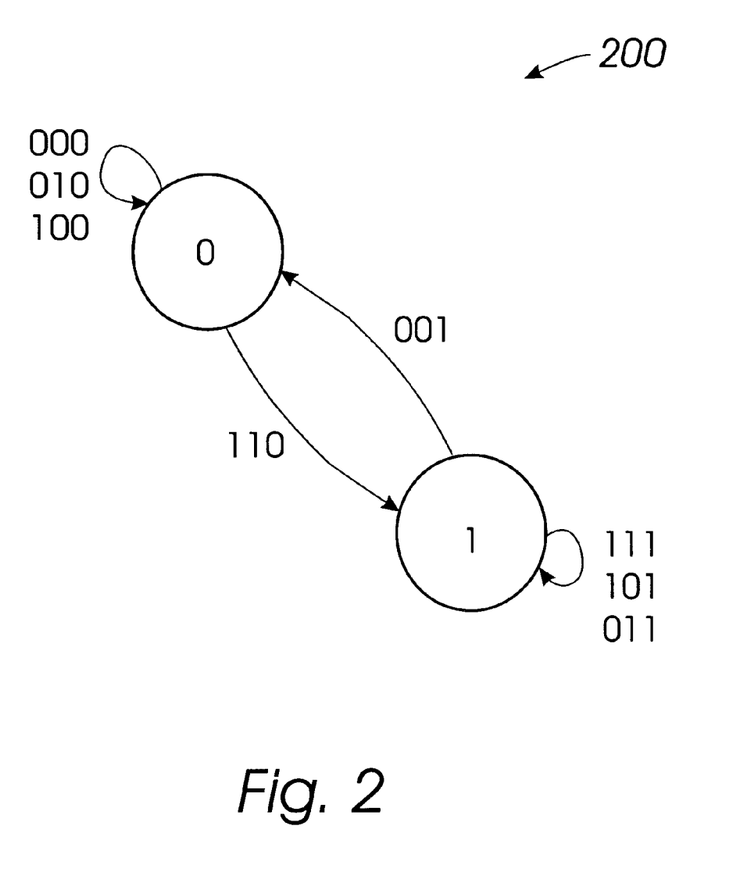
FIG. 2 is a diagram of an embodiment of a state machine capable of determining whether a connector is being attached to or removed from the circuit in FIG. 1.

The embodiment of state machine 200 shown in FIG. 2 includes a disconnected state 0 and a connected state 1. The circles and arrows describe how state machine 200 transitions from one state to another. In general, the circles in a state machine represent a particular value of the state variable. The lines with arrows describe how the state machine transitions from one state to the next state. One or more boolean expressions are associated with each transition line to show the criteria for a transition from one state to another. If the boolean expression is TRUE and the current state is the state at the source of the arrowed line, the state machine will transition to the destination state on the next clock cycle. The diagram also shows one or more sets of the values of the output variables during each state next to the circle representing the state.

In state machine 200, the input signals $S_{1i}$, $S_{2i}$, and connection status is indicated by a Boolean expression with three numbers representing in order from left to right, the state of the input signals $S_{2i}$, and $S_{1i}$, and connection status, where each number can have the value of 1 or 0 depending on the corresponding state of the parameter. Thus, States 000, 010 and 100 indicate no connection to a device. A transition from disconnected to connected occurs when State 110 is detected. Similarly, States 011, 101, and 111 indicate a connection to a device, and a transition from connected to disconnected occurs when State 001 is detected.

Figure 3:
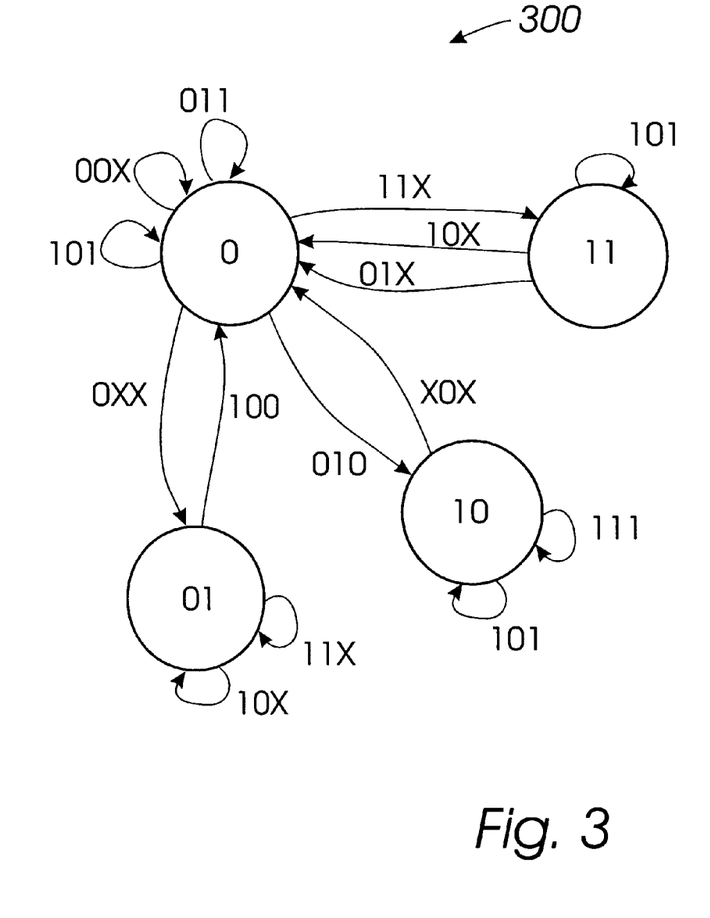
FIG. 3 is a diagram of an embodiment of a state machine capable of determining whether a connector has been properly attached to a device.

State machine 300 determines the state of signals $S_{1i}$, $S_{2i}$, $S_{1o}$, and $S_{2o}$ based on connection status and a change in either input signal $S_{1i}$ or $S_{2i}$. In some embodiments, the transitions between states follow the paths shown in TABLES II, III, IV, and IV above. The input signals $S_{1i}$, $S_{2i}$, and connection status are indicated by a Boolean expression with three numbers representing in order from left to right, the state of the input signals $S_{2i}$ and $S_{1i}$, and connection status, where each number can have the value of 1 or 0 depending on the corresponding state of the parameter. The states of the output signals $S_{2o}$ and $S_{1o}$ are shown as a Boolean expression in the state circles 00, 01, 10 and 11.

An example of Verilog instruction code included in an embodiment of state machines 200 and 300 is included below in "module conn_stat".

```
module conn_stat(_s_in, _s_out, conn, _reset);
    input [1:0] _s_in;
    input _reset;
    output [1:0] _s_out;
    output conn;
    // Current Output signal states:
    //   00 : not connected
    //   01 : connection detected on _s_in[1], drive _s_out[0]
    //   10 : connection detected on _s_in[0], drive _s_out[1]
    //   11 : connected
    reg [1:0] state;
        reg [0] conn_state;
    assign _s_out[1] = (state == 2'b10)? 0: 1'bz;
    assign _s_out[0] = (state == 2'b01)? 0: 1'bz;
    assign conn = conn_state;
    // Determine the connectivity status because path 8 ("1000")
    in Table I
    // can remain in state 00 or go to state 01, and path 4 ("0100")
    in Table I
    // can remain in state 00 or go to state 10. This information
    // is used in the case statement following this case statement.
    always @(_reset or _s_in or conn_state or state) begin
        if (~_reset)
            conn_state <= 0;
        else
            case ({~_s_in, conn_state})
                3'b000 : conn_state <= 0;
                3'b010 : conn_state <= 0;
                3'b100 : conn_state <= 0;
                3'b110 : conn_state <= 1;
                3'b111 : conn_state <= 1;
                3'b101 : conn_state <= 1;
                3'b011 : conn_state <= 1;
                3'b001 : conn_state <= 0;
            endcase
        end
    always @(_reset or _s_in or state or conn_state) begin
        if (~_reset)
            state <= 2'b00;
        else
            casez ({~_s_in, state})
                // No connector, state is 0
                4'b0000 : state <= 2'b00;
                // Connector attached, state was 0 ("00") or 1 ("01")
                // Use connectivity info from above
                // Path 4?
                4'b0100 : begin
                    if (conn_state)
                        state <= 2'b00;
                    else
                        state <= 2'b10;
                    end
                // Connector attached, state was 0 ("00") or 2 ("10")
                // Use connectivity info from above
                // Path 8?
                4'b1000 : begin
                    if (conn_state)
                        state <= 2'b00;
                    else
                        state <= 2'b01;
                    end
                // Coming out of reset with a connector attached
                // path 12 in Table I
                4'b1100 : state <= 2'b11;
                // Connector attached, input signal has changed
                //path 6 in Table I
                4'b0110 : state <= 2'b10;
                // path 9 in Table I
                4'b1001 : state <= 2'b01;
                // path 15 in Table I
                4'b1111 : state <= 2'b11;
                // Connector detached, state not 0
                // path 2 or 10 in Table I
                4'b?010 : state <= 2'b00;
                // path 1 or 5 in Table I
                4'b0?01 : state <= 2'b00;
                // path 11 in Table I
                4'b1011 : state <= 2'b00;
                // path 7 in Table I
                4'b0111 : state <= 2'b00;
                // Connector is connected, second input signal transitions
                // path 14 in Table I
                4'b1110 : state <= 2'b10;
                // path 13 in Table I
                4'b1101 : state <= 2'b01;
                // inputs 0011, 1011, and 0111, (paths 3, 7, and 11 in Table I)
                are illegal,
                // set default state
                default: state <= 2'b00;
            endcase
        end
endmodule
```

The preceding code instructions monitor the connection status (conn_state) to determine if a connection has been made or broken. State machine 300 monitors two input signals $S_{2i}$ and $S_{1i}$, which are represented in the code as input parameters "input [1:0] _s_in". If one input signal is pulled low, indicating a connection, the other input signal is then driven low in case the input line is being used as a sense line by the device being connected. The output signals $S_{2o}$ and $S_{1o}$ are represented by the output parameters "output [1:0] _s_out", and are set based on the state of the input signals $S_{2i}$ and $S_{1i}$ and the connection status (conn_state). The code instructions also monitor a reset signal on the device and set the state according to whether a connector is attached as the reset is performed.

Figure 4:
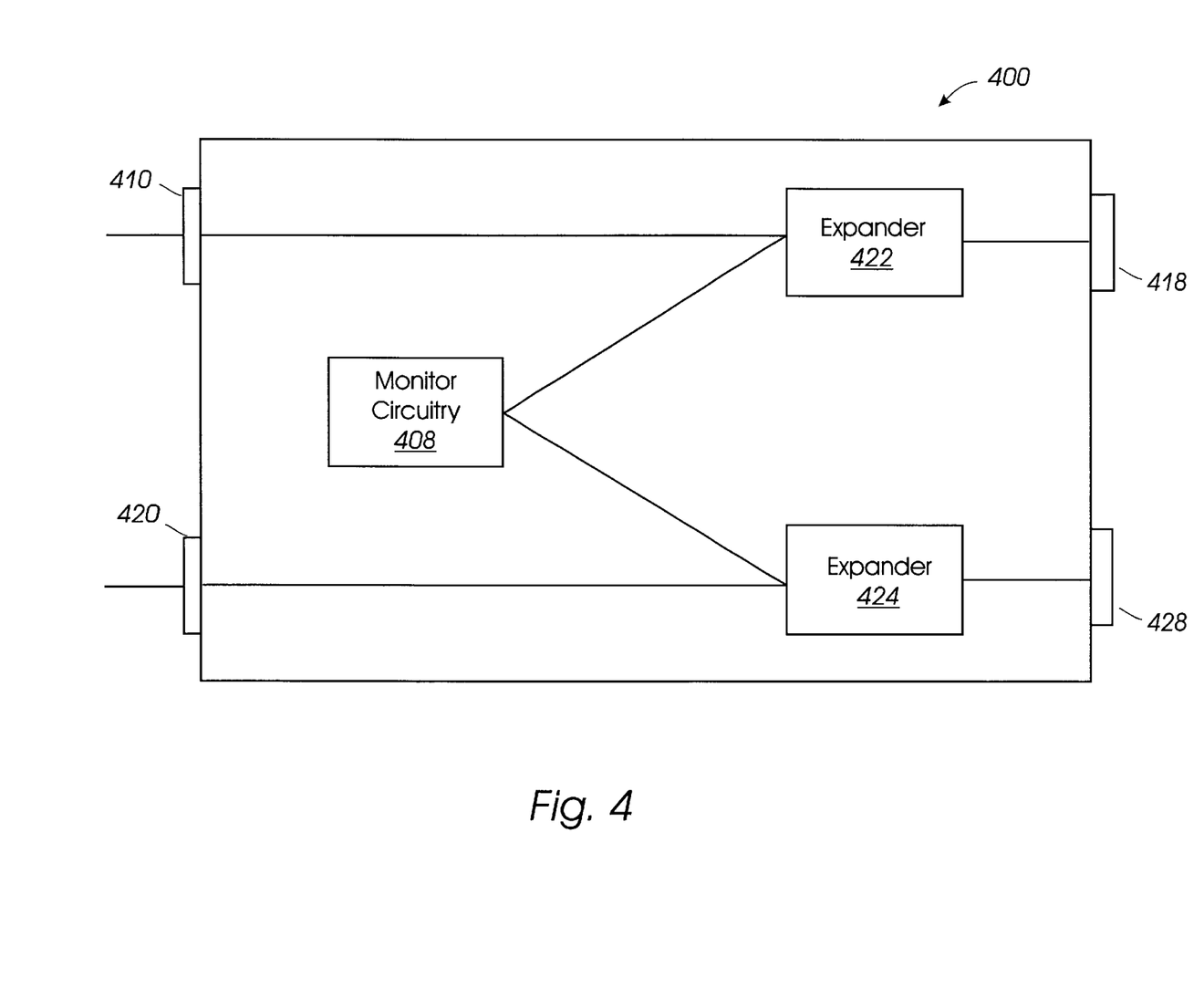
FIG. 4 is a schematic block diagram showing an example of a bus architecture that can utilize the illustrative connector to determine whether a cable is connected or unconnected.

Referring to FIG. 4, an embodiment of a bus controller card (BCC) 400 is an example of a system in which circuit 100 (FIG. 1) can be used to determine whether a proper connection has been made to BCC 400. The technique isolates two or more ground pins in each of ports 410 and 420, pulling the ground pins high, and monitoring the ground pins to detect whether the pins are pulled low due to a device being connected at ports 410 and/or 420. It should be noted that the disclosed embodiments for monitoring connections can be utilized in other types of devices.

In a specific embodiment, BCC 400 is connected between a HBA and one or more SCSI peripherals, such as disk drives. SCSI standards specify a term power range between 3.0 volts and 5.25 volts, and a diff_sense signal voltage range between 0.7 volts and 1.9 volts to indicate an LVD connection. The SCSI standards further specify that at least one port be connected to a host computer (not shown) with a HBA that supplies termination, term power, and diff_sense signal. The other port can be connected to another HBA or a terminator (not shown).

Term power and diff_sense are signals that run through both ports 410 and 420 as set forth in the SCSI specification (SP-1 through SP-4). If only one port is connected to an operating Host Bus Adapter (HBA), the term power and diff_sense signals remain although a valid front end connection no longer exists. Accordingly both ports 410 and 420 are monitored to assure both have valid connections. Ports 410, 420 can have a variety of configurations. A proper connection is one that has at least one port connected to an HBA and the other port connected to an HBA or a terminator device, with valid term power and diff_sense signals. An improper connection has only one port connected. An unconnected connection has none of the ports connected, or both ports connected but no term power available. To determine whether a proper, improper, or unconnected configuration exists, in some embodiments, at least two pins are isolated as described herein to avoid a condition in which the device being connected monitors one of the same ground pins for the same reason of determining when a connection has been properly made.

Monitor circuitry 408 is coupled to communicate with expanders 422, 424, which are devices that enable a user to expand data communication bus capabilities. A user can combine single-ended and differential interfaces using an expander/converter; extend cable lengths to greater distances via an expander/extender; and isolate bus segments via an expander/isolator. Expanders can also allow a user to increase the number of peripherals the system can access, and/or dynamically reconfigure components. For example, systems based on HVD SCSI can use differential expander/converters to allow a system to access a LVD driver in the manner of a HVD driver.

Expanders 422, 424 support installation, removal, or exchange of peripherals while the system remains in operation. An isolation function monitors and protects devices connected to BCC 400 by delaying the actual power up/down of the peripherals until an inactive time period is detected between bus cycles, thus preventing interruption of other bus activity. This feature also prevents power sequencing from generating signal noise, which can prevent data signal corruption. In some embodiments, expanders 422, 424 are implemented in an integrated circuit from LSI Logic Corporation in Milpitas, Calif., such as part numbers SYM53C 180 or SYM53C320, depending on the data transfer speed. Other suitable devices can be utilized.

Ports 410 and 420 include connector portions that typically comprise a male portion with rows of pins, or a female portion with rows of sockets. The connector portions on ports 410 and 420 mate with compatible connector portions on the device being connected to BCC 400. By isolating at least two pins, a condition is avoided in which the device being connected also monitors one of the same ground pins to determine when a connection has been properly made. Circuit 100 (FIG. 1) thus provides a technique to automatically sense when a device is connected to or disconnected from one or more of a system's connectors, as well as whether a proper or improper connection exists.

The logic modules and circuitry described here may be implemented using any suitable combination of hardware, software, and/or firmware, such as Field Programmable Gate Arrays (FPGAs), Application Specific Integrated Circuit (ASICs), or other suitable devices. A FPGA is a programmable logic device (PLD) with a high density of gates. An ASIC is a microprocessor that is custom designed for a specific application rather than a general-purpose microprocessor. The use of FPGAs and ASICs improves the performance of the system over general-purpose CPUs, because these logic chips are hardwired to perform a specific task and do not incur the overhead of fetching and interpreting stored instructions. The logic modules can be independently implemented or included in one of the other system components such as controllers. Similarly, other components have been discussed as separate and discrete components. These components may, however, be combined to form larger or different integrated circuits or electrical assemblies, if desired.

While the invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps necessary to provide the structures and methods disclosed herein, and will understand that the components and their arrangement are given by way of example only. The configurations can be varied to achieve the desired structure as well as modifications, which are within the scope of the invention. Variations and modifications of the embodiments disclosed herein may be made based on the description set forth herein, without departing from the scope of the invention as set forth in the following claims.

In the claims, unless otherwise indicated the article "a" is to refer to "one or more than one".

I claim:

1. An apparatus for detecting connection status of a plurality of devices, the apparatus comprising:
   a plurality of connectors, wherein each connector is connectable to one of the devices;
   a plurality of first input signal lines, wherein each first input signal line is coupled to a first pin on a corresponding one of the connectors;
   a plurality of first output signal lines, wherein one end of each first output signal line is coupled to a corresponding one of the first input signal lines; and
   a control device coupled to another end of the first input signal lines and to another end of the first output signal lines.

2. The apparatus of claim 1, wherein the control device is operable to:
   monitor the input signal lines to detect when at least one of the plurality of devices is attached or removed;
   set a corresponding connection status parameter based on whether the at least one device was connected or disconnected; and
   set the value of the signal of the corresponding input signal to a predetermined value when the connection status parameter indicates the at least one device was disconnected.

3. The apparatus of claim 1, wherein the control device is operable to set the value of the signal on the first output signal lines.

4. The apparatus of claim 1, wherein the apparatus further comprises:
   a plurality of second input signal lines, wherein each second input signal line is coupled to a second pin on the corresponding connector; and
   a plurality of second output signal lines, wherein one end of each second output signal line is coupled to a corresponding one of the second input signal lines, wherein the control device is coupled to another end of the second input signal lines and to another end of the second output signal lines.

5. The apparatus of claim 1, wherein the apparatus further comprises: a bus interface card coupled to the plurality of connectors.

6. The apparatus of claim 1, wherein the control device further comprises at least one of a field programmable gate array (FPGA) and a programmable logic device (PLD).

7. The apparatus of claim 1, wherein the apparatus further comprises: a SCSI bus interface card coupled to the plurality of connectors and the control device.

8. The apparatus of claim 4, wherein the control device is further operable to:
   detect a change in the signals on the first and second input signal lines;
   set a corresponding connection status parameter based on whether at least one of the devices was connected or disconnected;
   set the value of the signals on the second output signal lines; and
   set the value of the signal of the corresponding input signal to a predetermined value when the connection status parameter indicates the at least one device was disconnected.

9. The apparatus of claim 8, wherein the first pins and the second pins are ground pins.

10. The apparatus of claim 8, wherein the signals on the first and second output signal lines are pulled low when the corresponding device is connected and tri-stated when the corresponding device is not connected.

11. The apparatus of claim 1, wherein the apparatus further comprises a LVD SCSI bus interface card coupled to the plurality of connectors and the control device.

12. A communication system comprising:

a plurality of communication ports; and a monitor circuit coupled to the communication ports, wherein the monitor circuit monitors at least two input signals from each port to determine whether a device is properly connected to each of the ports.

13. The communication system of claim 12, wherein each port comprises a plurality of interfaces to input signal lines, and the monitor circuit is further operable to set a signal on at least two of the input signal lines and to detect a change in the signal on at least one of the two input signal lines due to the device being connected or disconnected.

14. The communication system of claim 13, further comprising:

at least two output signal lines, wherein one end of each output signal line is coupled to a corresponding one of the at least two input signal lines; and another end of the at least two output signal lines is coupled to the monitor circuit.

15. The communication system of claim 14, wherein the monitor circuit is further operable to set a signal on at least one of the output signal lines when the monitor circuit detects a change in the signal on at least one of the input signal lines due to the device being connected or disconnected.

16. The communication system of claim 15, wherein the monitor circuit is further operable to set a signal on the other of the at least one input signal lines when the monitor circuit detects a change in the signal on the at least one output signal lines.

17. The communication system of claim 16, further comprising:

a plurality of bus interface cards, wherein at least two of the ports are coupled to communicate with each of the bus interface cards.

18. The communication system of claim 16, wherein a portion of the monitor circuit is implemented with a first state machine.

19. The communication system of claim 16, wherein another portion of the monitor circuit is implemented with a second state machine, wherein the first state machine determines whether a device is currently connected, and the second state machine sets the signals on the output signal lines based on the signals on the input signal lines and whether a device is currently connected.

20. A method for monitoring a connection to a device, wherein an input line is coupled between the connection and a control circuit on the device, the method comprising:

pulling an input signal on the input line high via the control circuit;

monitoring the input signal to detect when the input signal is pulled low by a connection being made to the device;

setting a connection status parameter to indicate the connection;

monitoring the input signal to detect when the connection is being removed from the device;

setting the connection status parameter to indicate the disconnection; and setting the input signal to a predetermined value when the connection status parameter indicates the disconnection.

21. The method of claim 20, further comprising:

setting the signal on an output line to a predetermined value, wherein the output line is coupled between an intermediate point on the input line and the control circuit.

22. A method for monitoring connections to ports on a bus interface card, the method comprising:

monitoring each port to detect when a first input signal changes to a predetermined state;

changing the state of a second output signal connected to the corresponding port when the state of the first input signal changes to the predetermined state and a device has been connected to the corresponding port; and changing the state of a second input signal when the state of the second output signal changes to the predetermined state.

23. The method of claim 22, further comprising:

monitoring each port to detect when the second input signal changes to the predetermined state;

changing the state of the first input signal when the state of the second input signal changes to the predetermined state and the device has been disconnected from the corresponding port; and disabling a first output signal and the second output signal.

24. The method of claim 22, further comprising:

monitoring each port to detect when the second input signal changes to the predetermined state;

changing the state of the first output signal connected to the corresponding port when the state of the second input signal changes to the predetermined state and a device has been connected to the corresponding port; and changing the state of the first input signal.

25. The method of claim 22, further comprising:

monitoring each port to detect when the second input signal changes from the predetermined state;

disabling the first output signal when the state of the second input signal changes from the predetermined state and the device has been disconnected from the corresponding port; and changing the state of the first input signal.

* * * * *